United States Patent [19]

Stahlecker et al.

[11] E Re. 30,167

[45] Reissued Dec. 18, 1979

[54] APPARATUS AND METHOD FOR START-SPINNING ON AN OPEN-END SPINNING MACHINE

[76] Inventors: Fritz Stahlecker, Josef Neidhart-Strasse 18, D-7341 Bad Uberlingen; Hans Stahlecker, Haldenstrasse 20, D-7334 Suessen, both of Fed. Rep. of Germany

[21] Appl. No.: 812,411

[22] Filed: Jul. 1, 1977

Related U.S. Patent Documents

Reissue of:

[64] Patent No.: 3,892,062
Issued: Jul. 1, 1975
Appl. No.: 463,151
Filed: Apr. 22, 1974

[30] Foreign Application Priority Data

Apr. 30, 1973 [DE] Fed. Rep. of Germany ..... 2321775

[51] Int. Cl.[2] ..... D01H 15/00; D01H 13/14

[52] U.S. Cl. ..... 57/263; 57/78

[58] Field of Search ..... 57/34 R, 56, 58.89–58.95, 57/78, 80, 81, 93, 156, 92, 97, 261, 263

[56] References Cited

U.S. PATENT DOCUMENTS

| | | | |
|---|---|---|---|
| 3,334,479 | 8/1967 | Mikulecky et al. | 57/58.89 X |
| 3,354,627 | 11/1967 | Cizck et al. | 57/81 |
| 3,354,631 | 11/1967 | Elias et al. | 57/58.95 |
| 3,375,649 | 4/1968 | Bures et al. | 57/81 X |
| 3,492,804 | 2/1970 | Landwehrkamp | 57/80 |
| 3,541,774 | 11/1970 | Sterba et al. | 57/58.89 X |
| 3,597,911 | 8/1971 | Schiltknecht | 57/56 |
| 3,662,532 | 5/1972 | Stahlecker | 57/58.89 |
| 3,667,205 | 6/1972 | Brazda et al. | 57/58.89 |
| 3,678,673 | 7/1972 | Prochazka et al. | 57/34 R X |
| 3,695,017 | 10/1972 | Hori et al. | 57/81 X |
| 3,704,579 | 12/1972 | Tooka et al. | 57/34 R |
| 3,739,565 | 6/1973 | Nagel | 57/58.89 |
| 3,749,327 | 7/1973 | Roethke | 57/34 R X |
| 3,760,576 | 9/1973 | Chatelier et al. | 57/34 R |
| 3,780,513 | 12/1973 | Watanabe et al. | 57/34 R X |
| 3,791,128 | 2/1974 | Landwehrkamp et al. | 57/93 |
| 3,803,823 | 4/1974 | Niestroj et al. | 57/34 R |
| 3,810,352 | 5/1974 | Miyuzaki et al. | 57/34 R |
| 3,842,579 | 10/1974 | Batling | 57/34 R |

*Primary Examiner*—Donald Watkins
*Attorney, Agent, or Firm*—Craig and Antonelli

[57] ABSTRACT

An apparatus for start-spinning a thread is arranged movably relative to each individual spinning unit along an open-end spinning machine in order to be able to perform start-spinning operations there if required. In order to avoid having to start spinning at the generally very high operating speeds of the spinning rotors, because the start-spinning operation would be made more difficult by these high speeds, in accordance with the invention the spinning rotor runs up to speed from a standstill during the start-spinning operation after a brake has been released, so that spinning is started during a period in which the spinning rotor has not yet achieved its operating speed. The start-spinning speed is therefore clearly lower than the operating speed of the spinning rotor.

33 Claims, 2 Drawing Figures

Figure 1:
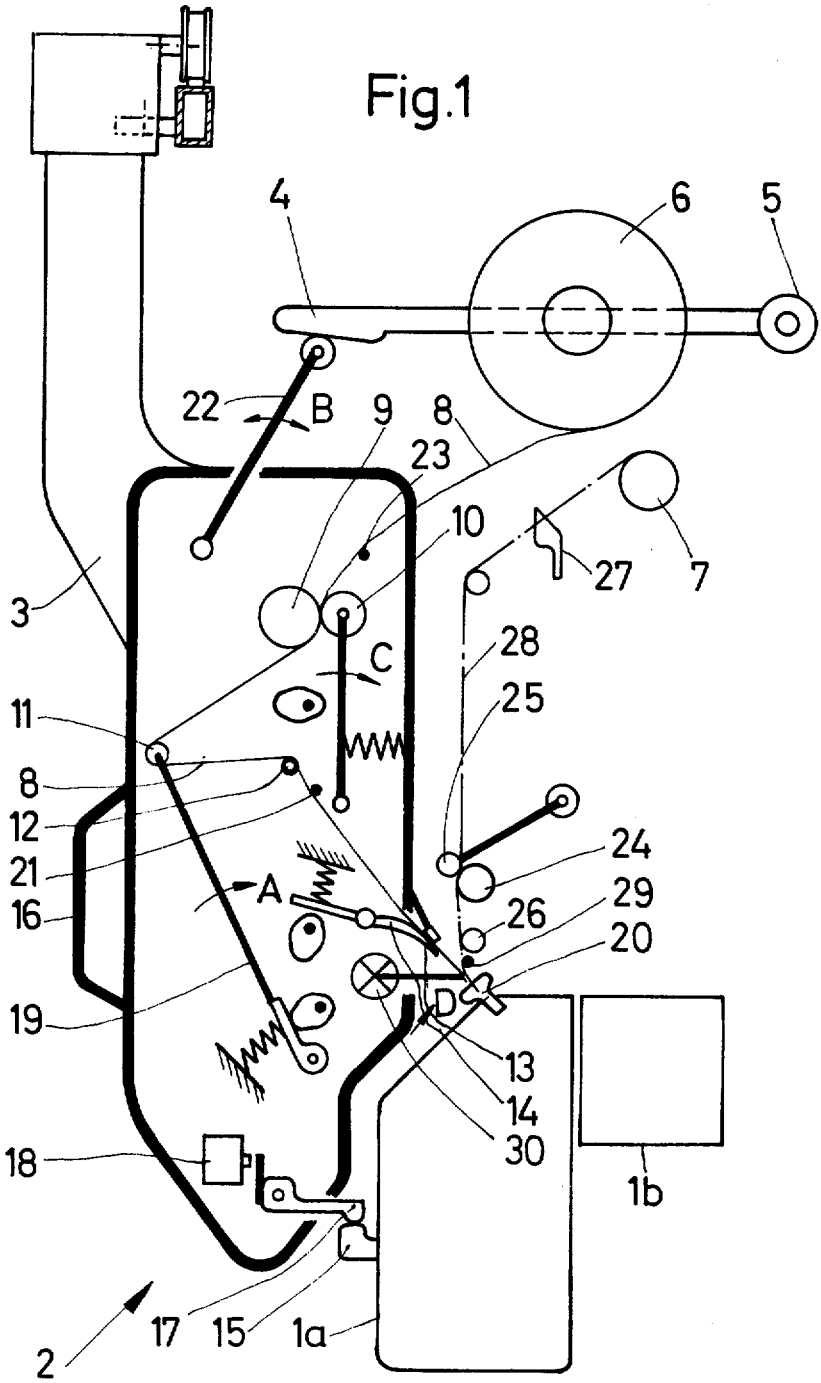

4
6
5
22
B
9
8
23
10
27
7
3
28
C
25
11
8
12
21
16
A
24
29
26
20
19
D
13
14
30
18
1b
17
15
1a
2

APPARATUS AND METHOD FOR START-SPINNING ON AN OPEN-END SPINNING MACHINE

Matter enclosed in heavy brackets [ ] appears in the original patent but forms no part of this reissue specification; matter printed in italics indicates the additions made by reissue.

The present invention relates to an apparatus for start-spinning, movable along an open-end spinning machine, which inserts a thread guided in the vicinity of a spinning rotor into said spinning rotor and draws said thread off again after spinning has been started.

On an open-end spinning machine, the start-spinning operation, for remedying a thread break for example, numbers among the most difficult operating operations and can be performed only by especially trained operating personnel. For this reason, a number of auxiliary apparatuses have been developed for simplifying the start-spinning operation. Thus, a fully-automated start-spinning apparatus, movable along an open-end spinning machine, is known (German Laid Open patent application No. 2,008,142), which sucks in the broken thread from the winding bobbin, advances it to the vicinity of the spinning rotor, trims it to the predetermined length and then inserts it into the spinning rotor, whereupon the continuous spinning operation is resumed again. In a similar start-spinning apparatus (German Laid Open patent application No. 2,012,108), in the event of a thread break a start-spinning apparatus, movable along the open-end spinning machine, first lifts the bobbin away from the winding roller, temporarily drives the bobbin in a direction which causes it to unwind, sucks in the broken end of the thread, grips this end with gripping means, trims it to a desired length and inserts it into the spinning rotor, whereupon the operating condition is reinstated.

Also known (German Laid Open patent application No. 2,217,167) is a stationary, semi-automated start-spinning apparatus which performs the start-spinning operation while retaining the rotary motion of the winding roller in one direction and through the formation of a starting reserve of thread.

All known apparatuses have significant deficiencies. While the operating personnel is largely relieved of having to remedy a thread break, the transition from the moment of start-spinning to the operating condition of continuous thread draw-off is not solved in a satisfactory manner with the known apparatuses. The sudden transition from standstill, or even reverse motion, of the supply of thread to the operation condition, with its high thread draw-off speed, produces a tension peak which often causes renewed breaking of the thread which has just been start-spun. In addition, it has hitherto been necessary to provide a precise thread reverse to ensure precise consumption thereof at a given moment of start-spinning and upon resumption of the continuous thread draw-off. An immediate new thread break is otherwise the result. The higher the operating speed of the spinning rotor, the clearer are the above mentioned disadvantages. None of the previously known start-spinning apparatuses are currently able to dependably ensure proper, trouble-free start-spinning of a broken thread at rotor speeds in excess of 70,000 rpm without renewed thread breakage.

It has therefore been attempted (German Laid Open patent application No. 2,058,604) to reduce the speed of the entire spinning machine while start-spinning a broken thread, as the start-spinning operation can be more or less mastered at lower operating speeds. However this means reduced production during the period of slower running, which is increasingly disadvantageous if the number of thread breaks is frequent. Moreover, a thread with different elongation properties and/or different appearance is produced during the brief reduction in speed, which results especially in irregularities when dyeing solid-colour merchandise.

It has also already been attempted to reduce the speed of each individual spinning unit, independently of the other spinning points (Swiss Pat. No. 531,059). While this eliminates the above mentioned disadvantages, it results in a complicated machine design and increased costs. The fact that machines of this type have not become widely popular in actual practice evidences the inadequacy of this method.

Controlling the return of the thread to the spinning rotor with a pulse generator after a thread break is also known (German Laid Open patent application No. 2,130,690). The purpose of an arrangement of this type is to precisely determine the length of the thread to be returned. Moreover, the end of the thread should reach the point of connection at the wall of the spinning chamber at a suitable speed and at the moment a ring of fibres with the desired properties has built up in the spinning chamber. This arrangement is quite complicated as it must operate very accurately; in addition, it has not solved the problem of avoiding tension peaks after the start-spinning operation.

It is the object of the present invention to create a start-spinning apparatus of the type mentioned at the outset, in which all members which must operate with a high degree of accuracy are contained only once in a movable apparatus which can serve a number of spinning points and do not have to be installed at every spinning point. This start-spinning apparatus should operate dependably and trouble-free with a minimum of design effort, even at maximum rotor speeds. Moreover, according to the present invention, there should be no excessive tension peaks after the start-spinning operation, thereby eliminating the initial acceleration of the thread and preventing renewed thread breakage. According to the present invention, this object is solved in that means are provided [with] *which* cause spinning to be started at a preselected time during the period required for the spinning rotor to reach its operating speed from its previously braked condition. This permits the start-spinning operation to take place at a quasi-reduced speed of the spinning rotor, without having to run the other spinning points at reduced speed and without having to arrange speed control means at each individual spinning point.

In this connection, it is especially advantageous for the moment of start-spinning to be predetermined by temporarily coupling the start-spinning apparatus with the rotor brake. In this manner, the movable start-spinning apparatus can determine the moment that the rotor runs up to operating speed and can easily insert the thread to be start-spun into the rotor at the optimum moment. In addition, it is also advantageous for the start-spinning apparatus to be switched on with a delay by the release of the rotor brake. This permits the start-spinning operation to be located in the speed range of the spinning rotor which is most favourable for the start-spinning operation, which experience has shown to be approx. 60% of the operating speed. Moreover, it is also practical for the magnitude of the delay to be adjustable. This permits the moment of start-spinning to be matched to the respective operating conditions, so that the optimum moment of start-spinning can always be selected.

In addition, it is also advantageous for the start-spinning apparatus to contain thread draw-off rollers which temporarily supply the start-spun thread to a bobbin of the spinning machine. This measure eliminates the need for reversing the sense of rotation of the spinning machine's winding rollers. In this connection, it is practical for the thread draw-off rollers to be put in motion by a tension sensor located in front of the thread draw-off rollers in the start-spinning apparatus when a preselected thread tension has been reached in the draw-off direction. This permits the thread draw-off rollers to be put in motion at the moment the start-spun thread can be drawn off without danger of breakage.

Moreover, it is also advantageous for the thread draw-off rollers to be put in motion before the thread reserve contained in the start-spinning apparatus has been consumed. This intentionally excessive thread reserve eliminates the need for having to stipulate the moment of draw-off too precisely. In addition, it is further not necessary to start at the full draw-off speed, resulting in a noticeable reduction of the initial acceleration. Thread breakage as a result of the infamous "starting shock" is dependably avoided through this measure.

It is very advantageous for the peripheral speed of the thread draw-off rollers of the start-spinning apparatus to be lower than that of the winding rollers of the spinning machine. This permits the thread to be wound to sag briefly between the draw-off rollers of the start-spinning apparatus and the winding roller of the spinning machine, i.e. to be left loose and without tension. This ensures that the moments of lowering the winding bobbin onto the winding roller and startup thereof do not have to be too accurately matched and that a tension peak in this piece of thread is avoided. Because of the higher speed of the winding roller, the loose piece of thread between the winding roller and the draw-off rollers of the start-spinning apparatus is tensioned rapidly, yet smoothly. Thread breakage is avoided. It is also practical for a tension feeler located behind the thread draw-off rollers to cause the pressure roller of the thread draw-off pair of rollers to lift away from the other roller when a preselected thread tension has been achieved. It is thus possible to eliminate the clamping action of the draw-off pair of rollers at a given point.

Moreover, it is practical for the start-spinning apparatus to actuate a thread stop-motion of the spinning machine, thus initiating supply of fibres to the spinning rotor in a known manner. This permits actuation to be performed by the movable start-spinning apparatus.

In many embodiments of the invention, it may be possible for the sense of direction of the thread draw-off rollers of the start-spinning apparatus to be reversible. As thread draw-off rollers of this type which are contained in the start-spinning apparatus can serve many spindles and since only one set per machine is needed, for example, they can be designed in a relatively sophisticated manner so as to be able to reverse at very precise moments, in conjunction with gentle starting. In this manner, the need for a thread reserve is eliminated while simultaneously avoiding excessive thread tension peaks.

It is then also practical for the lift-off roller for the bobbin to be able to be driven in both directions. By matching the peripheral speed of the lift-off roller and the thread draw-off rollers of the start-spinning apparatus, the thread can be kept almost without tension both while being returned to the rotor and while subsequently being drawn off. This also results in the advantage that the bobbin does not have to be lowered and placed onto the spinning machine's winding roller until the bobbin has reached the same peripheral speed as the winding roller. This, also, avoids thread tension peaks, and thus thread breakage after start-spinning.

Figure 2:
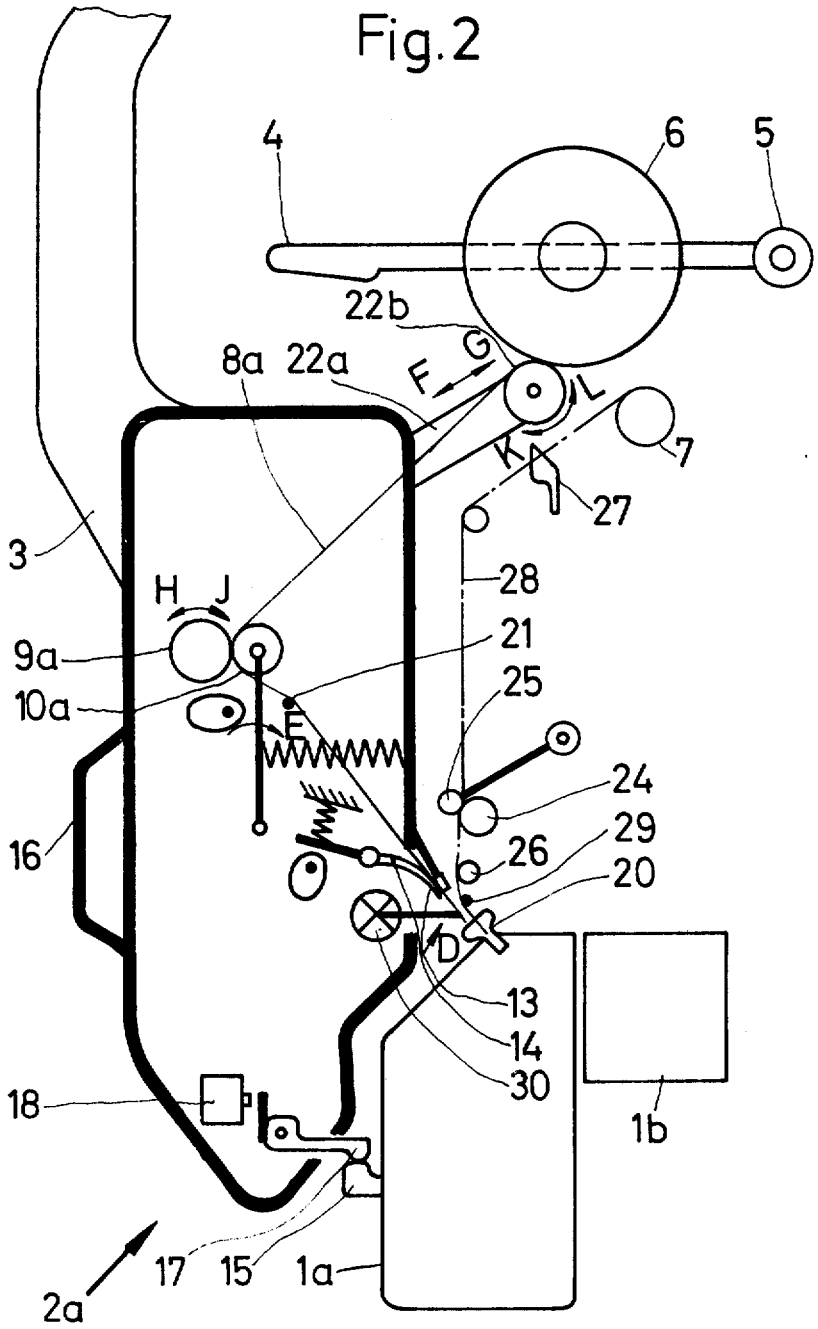

The above discussed and other objects, features and advantages of the present invention will become more apparent from the following description thereof, when taken in connection with the accompanying drawings, in which FIG. 1 shows a start-spinning apparatus according to the invention, with thread reserve, and FIG. 2 shows a start-spinning apparatus according to the invention, without thread reserve.

Referring now to the drawings, wherein like reference numerals designate like parts throughout the several views, it can be seen that the start-spinning apparatus, according to the invention operates semi-automatically. All work which can be performed easily and without skill by an operator is handled by the operator, while the difficult work, which must always be performed uniformly and with a high degree of precision, is performed by the apparatus according to the invention. The apparatus is designed in such a manner that it can be employed for remedying a thread break at a spinning point without having to make any structural alterations whatsoever to the spinning point itself or to the drive and control mechanism thereof. In order to still be able to influence the start-spinning at a spinning point, the apparatus has auxiliary means which act upon the control elements present at a spinning point.

FIGS. 1 and 2 each show schematically only the area of one individual spinning point of an open-end spinning machine. Produced at the spinning point, comprising members 1a and 1b, is a thread, which is advanced upward and wound onto a bobbin 6 with the aid of a winding roller 7. The bobbin 6 is mounted on a bobbin holder 4, which can be swivelled about a stationary axle 5, in such a manner that it can be lifted away from winding roller 7.

If there is a thread break at a spinning point, the apparatus 2 for renewed start-spinning, which is suspended from an elevated rail, is moved to this spinning point. The drive of bobbin 6 is interrupted by lifting away bobbin holder 4. Bobbin holder 4 is placed on a support lever 22 of the apparatus 2. A sufficiently long thread 8 is then drawn off bobbin 6 and placed over a tension feeler 23 and a pair of drawoff rollers 9 and 10, of which only draw-off roller 9 is driven. Draw-off roller 10 is mounted on a lever which can be swivelled in the direction of arrow C. The thread is then led around to deviating rollers 11 and 12 and to a thread trapper 14, in which it is clamped after it has has been trimmed to the proper length by a cutter 13. Deviating roller 11 is located on the free end of a swivel arm 19 which, in the illustrated embodiment, is swivelled automatically by means of a control cam. The thread trapper 14 can be opened automatically by means of a similar control cam. Arranged behind deviating roller 12, which is mounted in a stationary manner, is a tension feeler 21 with which thread 8 is also in a contacting relationship.

The apparatus 2 for start-spinning also contains additional control elements with which it acts upon the functioning of the spinning unit without alterations having to be made to this spinning unit. Provided for this purpose is a switch 30, which is mechanically rotatable and which is associated to a thread stopmotion 29, arranged in the area of the thread removal channel 20, in such a manner that it can reverse thread stop-motion 29 to its operational position. Thread stopmotion 29 controls the supply of fibres to the unillustrated spinning rotor in a known manner.

Moreover, apparatus 2 also has an actuating lever 17, which is associated to a brake lever 15 of the spinning point, with which the brake of the spinning rotor is actuated. In the illustrated embodiment, the automatic portion of the start-spinning operation is initiated by brake lever 15, via actuating lever 17, to which an electric switch 18 is associated which starts the drive and control of apparatus 2. It is possible for initiation to be performed by first merely moving apparatus 2 to the area of the spinning point in order to be able to insert thread 8 in the manner illustrated in FIG. 1. Brake lever 15 is then pressed down and apparatus 2 is placed in its operating position, in which actuating lever 17 is located above brake lever 15. After releasing brake lever 15, the spinning rotor is not only started again, but the automatic start-spinning operation is also initiated. A handle 16 is provided on the apparatus for moving it to this position, which must be precisely aligned. It it also possible to immediately move apparatus 2 to the illustrated position, in which actuating lever 17 actuates the spinning rotor brake by means of brake lever 15. In this case, actuating lever 17 must have a lock which is overridden by actuating a release button or similar means, which is then the actual starter.

Switch 18 contains an adjustable delay element, for example a time relay, which governs when automatic start-spinning is to be performed after the spinning rotor brake is released. Actual practice has shown that it is favourable for the spinning rotor to have reached about 60% of its operating speed during startspinning. The delay element of switch 18 is set accordingly. Switch 18 opens thread trapper 14 and switches the drive of swivel arm 19 on, which swivels in the direction of arrow A. This releases the thread reserve created by deviating roller 11, so that the end of the thread can be sucked to the spinning rotor through thread removal channel 20. At a given tension, the tension feeler 21 switches solenoid switch 30 in such a manner that said solenoid switch 30 places thread stop-motion 29 in its operational position, which starts the supply of fibres to the spinning point. The drive of draw-off rollers 9 and 10 is then switched on either by means of the same tension feeler 21 and a delay element or by means of a second tension feeler set for a different value, so that the thread is drawn off after spinning is started. In this connection, it is practical for the thread reserve determined by deviating roller 11 to be selected in such a manner that it is large enough so as not to be completely consumed when the end of the thread is sucked into the spinning rotor, thereby providing smooth starting when draw-off rollers 9 and 10 are switched on. When the drive of draw-off rollers 9 and 10 is switched on, bobbin holder 4 is simultaneously power-lowered by shifting the position of support lever 22, so that bobbin 6 is in a contacting relationship with winding roller 7. The take-off speed of winding roller 7 is selected in such a manner as to be higher than the take-off speed of take-off rollers 9 and 10, so that the area of loose thread located between take-off rollers 9 and 10 and winding roller 7 is tensioned. This tensioning is monitored by tension feeder 23, which actuates the drive of the retaining arm of non-driven draw-off roller 10 at a preselected tension, so that this roller is swivelled away from draw-off roller 9 in the direction of arrow C. This completes the actual start-spinning operation.

In order to be able to remove apparatus 2, thread 8 must be manually transferred to the thread guide elements of the spinning point by the operator. As shown by the dash-dotted line 28 in FIG. 1, the thread then runs to winding roller 7 and bobbin 6 over thread stop-motion 29, a thread guide shaft 26, a pair of draw-off rollers 24 and 25, a deviating shaft and a traversing thread guide 27.

In the illustrated embodiment, the drive and control means of apparatus 2 are not shown in more detail or explained. Electric servo-motors are preferably employed, which can rotate the illustrated cams of the individual drives, for example. It is only necessary to ensure that it is possible for draw-off roller 10 and thread trapper 14 to also swivel without their drives being switched on in order to be able to insert thread 8 manually. It is practical for apparatus 2 to have a plate-shaped configuration, with the thread guide elements being arranged primarily on one side, while all other control and drive means are arranged on the other side of the plate. This provides a very clear, neat design, while thread 8 can be inserted without difficulty from one side.

The embodiment of the start-spinning apparatus illustrated in FIG. 2 differs from the embodiment of FIG. 1 primarily in that there is no thread reserve for start-spinning. However in order to still be able to supply thread 8a to the spinning rotor, the pair of draw-off rollers 9a and 10a are first driven in such a manner that thread 8a is drawn off bobbin 6, which has been lifted away from its winding roller 7, and released for being sucked into the spinning rotor. In this embodiment, bobbin 6, which has lifted away from its winding roller 7, is placed against a winding roller 22b of apparatus 2a, which is driven in synchronism with draw-off roller 9a. Winding roller 22b is arranged on a support lever 22a, which can be shifted in the direction of arrows F and G.

Initiation of the automatic portion of the start-spinning operation after thread 8a has been inserted is performed in a similar manner to the embodiment according to FIG. 1 by releasing the spinning rotor brake, whereby this motion is picked up from brake lever 15 by an actuating lever 17 and transferred to switch 18 with the delay element. Switch 18, which opens thread trapper 14, switches on the drive of draw-off roller 9a in such a manner that draw-off roller 9a rotates in the direction of arrow J at a given speed. This provides a sufficiently long length of thread to be able to supply the end of the thread trimmed by cutter 13 to the spinning rotor through thread removal channel 20. In a corresponding manner, winding roller 22b rotates in the direction of arrow L and supplies additional thread 8a. When a given tension has been reached, tension feeler 21 switches switch 30, which starts the supply of fibres by changing thread stop-motion 29. As soon as the preselected optimum start-spinning tension has then been reached, draw-off roller 9a, and thus draw-off roller 10a, are driven in the direction of arrow H. Winding roller 22b runs in the direction of arrow K in synchronism thereto. Special circuitry and/or corresponding selection of the electric drive motor for draw-off roller 9a and winding roller 22b ensures gentle starting so as to avoid excessive tension peaks in thread 8a. Draw-off rollers 9a and 10a, as well as winding roller 22b, are accelerated to the speed of rotation, and winding, of winding roller 7. When winding roller 22b has reached the same peripheral speed as winding roller 7, support lever 22a is retracted, so that bobbin 6 lowers onto winding roller 7. At the same time, the swivel arm with draw-off roller 10a is swivelled away in the direction of arrow E, so that the thread is now drawn off over winding winding roller 7, permitting the drive of draw-off roller 9a and winding roller 22b to be switched off. The thread is then manually transferred to the thread path 28 illustrated by the dash-dotted line, so that apparatus 2a can be removed from the spinning point.

The apparatuses shown in FIGS. 1 and 2 do not necessitate any alterations to the design of the spinning machine or individual spinning points. Although spinning is started at a reduced spinning rotor speed, the neighbouring spinning points and all common drives are not influenced. The brake of each spinning point, which can be actuated independently, initiates the start-spinning operation of the apparatuses when it is opened, as its movement is utilized as the starting signal for the automatic system. As the spinning rotor does not reach its operating speed until a certain amount of time has elapsed, this period of time can be utilized for start-spinning at reduced speed. Through the proper setting of the delay element contained in the automatic system, it is therefore possible for the start-spinning speed to be selected between zero and the operating speed.

Obviously, many modifications and variations of the present invention are possible in the light of the above teachings. It should therefore be understood that within the scope of the appended claims, the invention may be practiced otherwise than as specifically described.

Having thus fully disclosed our invention, what we claim is:

1. An apparatus for start-spinning, movable along an open-end spinning machine to a spinning unit, which returns a thread to a spinning rotor of said spinning unit and removes said thread therefrom again after spinning has been started, containing means for controlling the moment the start-spinning operation is commenced in such a manner that said start-spinning operation is performed during the period in which [the] *a* previously braked spinning rotor of said spinning unit starts up and at a speed which is lower than the operating speed of said spinning rotor, *said spinning machine including a plurality of said spinning units with common driving means, said spinning unit including rotor brake means actuable independently of neighboring commonly driven spinning units, said apparatus including brake control means for controlling actuation and release of the rotor brake means, said means for controlling including means for automatically initiating the start spinning operation in response to release of the rotor brake means to assure piecing during acceleration of the rotor toward its operating speed.*

2. The apparatus according to claim 1, in which the moment of start-spinning is stipulated by briefly coupling the apparatus for start-spinning with [a] *the rotor* brake *means* of said spinning rotor.

3. The apparatus according to claim 2, in which a motion of the *rotor* brake *means* occurring during release of said spinning rotor brake *means* is transferred as a starting signal to the apparatus for start-spinning, which contains means for delaying the start-spinning operation.

4. The apparatus according to claim 3, in which said means for delaying the start-spinning operation are adjustable.

5. The apparatus according to claim 1, in which draw-off rollers are provided which briefly handle the thread transport after spinning is started.

6. The apparatus according to claim 5, in which means for determining the tension of the thread are provided between the spinning rotor and the draw-off rollers, said means serving as a control element for switching on the drive means of said draw-off rollers.

7. The apparatus according to claim 5, in which means for producing a thread reserve are provided between the draw-off rollers and the spinning rotor, said means providing the length of thread required for insertion in the spinning rotor to start spinning.

8. The apparatus according to claim 6, in which the speed of rotation of the draw-off rollers is lower than the speed of rotation given by a winding roller to a bobbin for the thread to be wound.

9. The apparatus according to claim 5, in which means for determining the tension of the thread are arranged behind—viewed in the direction the thread is drawn off—the draw-off rollers, said means being able to be set for a preselected value and being attached to means for eliminating a clamping pressure between said draw-off rollers.

10. The apparatus according to claim 1, containing draw-off rollers which include drive means which can be driven in both directions for returning the thread to the spinning rotor and subsequently drawing said thread off again.

11. The apparatus according to claim 10, in which means for determining the tension of the thread are provided between the spinning rotor and the draw-off rollers, said means serving as a control element for reversing the drive of the draw-off rollers from supply to the spinning rotor to drawing off again.

12. The apparatus according to claim 10, in which the speed of rotation of the draw-off rollers in the draw-off direction away from the spinning rotor is lower than the speed of rotation applied by a winding roller to a bobbin for the thread to be wound.

13. The apparatus according to claim 10, in which means for determining the tension of the thread are arranged behind—viewed in the direction the thread is drawn off—the draw-off rollers, said means being able to be set for a preselected value and being attached to means for eliminating a clamping pressure between said draw-off rollers.

14. The apparatus according to claim 1, having means for actuating a thread stop-motion, arranged on the spinning unit, controlling the supply of fibres to the spinning unit.

15. The apparatus according to claim 1, containing a lift-off winding roller, equipped with lifting means for lifting a bobbin away from a winding roller and having drive means which can be switched on in both directions.

*16. A method for start-spinning a thread on an open-end spinning machine comprising:*

*returning a thread to a spinning rotor of an open-end spinning unit,*

*removing said thread from said spinning rotor after spinning has been started,*

*and controlling the moment the start-spinning operation is commenced in such a manner that said start-spinning operation is performed during the period in which a previously braked spinning rotor of said spinning unit starts up and at a speed which is lower than the operating speed of said spinning rotor, said spinning machine including a plurality of said spinning units with common driving means, said spinning unit including rotor brake means actuable independently of neighboring commonly driven spinning units with common drives, said controlling including automatically initiating the start-spinning operation in response to release of the rotor brake means to assure piecing during acceleration of the rotor towards its operating speed.*

*17. The method according to claim 16, wherein said controlling includes briefly coupling apparatus for start-spinning with the rotor brake means of said spinning rotor.*

*18. The method according to claim 17, wherein said controlling includes transferring motion of the rotor brake means occurring during release of said rotor brake as a starting signal to said apparatus for start-spinning, said apparatus for start-spinning containing means for delaying the start-spinning operation.*

*19. The method according to claim 18, wherein said means for delaying the start-spinning operation are adjustable.*

*20. The method according to claim 16, further comprising briefly handling the thread transport by draw-off rollers after spinning is started.*

*21. The method according to claim 20, further comprising determining the thread tension between the spinning rotor and the draw-off rollers by tension determining means, said tension determining means serving as a control element for switching on drive means of said draw-off rollers.*

*22. The method according to claim 20, further comprising producing a thread reserver between the draw-off rollers and the spinning rotor by way of thread reserve producing means, said producing of a thread reserve including providing a length of thread required for insertion in the spinning rotor to start spinning.*

*23. The method according to claim 21, in which the speed of rotation of the draw-off rollers is lower than the speed of rotation given by a winding roller to a bobbin for the thread to be wound.*

*24. The method according to claim 20, in which means for determining the tension of the thread are arranged behind—viewed in the direction the thread is drawn off—the draw-off rollers, said means being able to be set for a preselected value and being attached to means for eliminating a clamping pressure between said draw-off rollers.*

*25. The method according to claim 16, wherein said returning and removing of a thread includes driving draw-off rollers which include drive means which can be driven in both directions for returning the thread to the spinning rotor and subsequently drawing said thread off again.*

*26. The method according to claim 25, further comprising determining the thread tension between the spinning rotor and the draw-off rollers by tension determining means, said tension determining means serving as a control element for reversing the drive of the draw-off rollers from supply to the spinning rotor to drawing off again.*

*27. The method according to claim 25, in which the speed of rotation of the draw-off rollers in the draw-off direction away from the spinning rotor is lower than the speed of rotation applied by a winding roller to a bobbin for the thread to be wound.*

*28. The method according to claim 25, in which means for determining the tension of the thread are arranged behind—viewed in the direction the thread is drawn-off—the draw-off rollers, said means being able to be set for a preselected value and being attached to means for eliminating a clamping pressure between said draw-off rollers.*

*29. The method according to claim 16, further comprising actuation of a thread stop motion, arranged on the spinning unit, for controlling the supply of fibers to the spinning unit.*

*30. The method according to claim 16, wherein a lift-off winding roller is provided, further comprising using said lift-off winding roller for lifting a bobbin away from a winding roller, said lift-off winding roller having drive means which can be switched on in both directions.*

*31. The method according to claim 16, further comprising selectively moving a mobile unit containing means for said returning, removing, and controlling along an open-end spinning machine to respective servicing stations adjacent respective spinning units of said spinning machine.*

*32. An apparatus for start-spinning, movable along an open-end spinning machine to a spinning unit, which returns a thread to a spinning rotor of said spinning unit and removes said thread therefrom again after spinning has been started, containing means for controlling the moment the start-spinning operation is commenced in such a manner that said start-spinning operation is performed during the period in which a previously braked spinning rotor of said spinning unit starts up and at a speed which is lower than the operating speed of said spinning rotor,*

*in which draw-off rollers are provided which briefly handle the thread transport after spinning is started, and*

*in which means for determining the tension of the thread are arranged behind—viewed in the direction the thread is drawn off—the draw-off rollers, said means being able to be set for a preselected value and being attached to means for eliminating a clamping pressure between said draw-off rollers.*

*33. An apparatus for start-spinning, movable along an open-end spinning machine to a spinning unit, which returns a thread to a spinning rotor of said spinning unit and removes said thread therefrom again after spinning has been started, containing means for controlling the moment the start-spinning operation is commenced in such a manner that said start-spinning operation is performed during the period in which a previously braked spinning rotor of said spinning unit starts up and at a speed which is lower than the operating speed of said spinning rotor,*

*containing draw-off rollers which include drive means which can be driven in both directions for returning the thread to the spinning rotor and subsequently drawing said thread off again, and*

*in which means for determining the tension of the thread are arranged behind—viewed in the direction the thread is drawn off—the draw-off rollers, said means being able to be set for a preselected value and being attached to means for eliminating a clamping pressure between said draw-off rollers.*

* * * * *